US010019399B2

(12) United States Patent
Mangano et al.

(10) Patent No.: US 10,019,399 B2
(45) Date of Patent: Jul. 10, 2018

(54) SYSTEM FOR DESIGNING NETWORK ON CHIP INTERCONNECT ARRANGEMENTS

(71) Applicants: STMicroelectronics (Grenoble 2) SAS, Grenoble (FR); STMicroelectronics S.R.L., Agrate Brianza (IT)

(72) Inventors: Daniele Mangano, San Gregorio di Catania (IT); Ignazio Antonino Urzi, Voreppe (FR)

(73) Assignees: STMicroelectronics (Grenoble 2) SAS, Grenoble (FR); STMicroelectronics S.R.L., Agrate Brianza (IT)

(*) Notice: Subject to any disclaimer, the term of this patent is extended or adjusted under 35 U.S.C. 154(b) by 160 days.

(21) Appl. No.: 14/940,026

(22) Filed: Nov. 12, 2015

(65) Prior Publication Data

US 2016/0070667 A1    Mar. 10, 2016

Related U.S. Application Data

(63) Continuation of application No. 14/511,014, filed on Oct. 9, 2014, now Pat. No. 9,202,002.

(30) Foreign Application Priority Data

Oct. 11, 2013   (IT) .................. TO2013A000824

(51) Int. Cl.
*G06F 17/50*    (2006.01)
*G06F 13/36*    (2006.01)
(Continued)

(52) U.S. Cl.
CPC .......... *G06F 13/36* (2013.01); *G06F 13/4068* (2013.01); *G06F 15/7807* (2013.01);
(Continued)

(58) Field of Classification Search
CPC ............................ G06F 17/7807; G06F 13/36
(Continued)

(56) References Cited

U.S. PATENT DOCUMENTS 6,857,110 B1    2/2005  Rupp et al.
9,202,002 B2 *  12/2015 Mangano ............ G06F 15/7807
(Continued)

FOREIGN PATENT DOCUMENTS

EP    2 325 747 A2    5/2011
EP    2 466 486 A1    6/2012

OTHER PUBLICATIONS

Hollstein et al., "Advanced hardware/software co-design on reconfigurable network-on-chip based hyper-platforms," *Computers and Electrical Engineering* 33:310-319, 2007.
(Continued)

*Primary Examiner* — Suchin Parihar
(74) *Attorney, Agent, or Firm* — Seed IP Law Group LLP

(57) ABSTRACT

A system for designing Network-on-Chip interconnect arrangements includes a Network-on-Chip backbone with a plurality of backbone ports and a set of functional clusters of aggregated IPs providing respective sets of System-on-Chip functions. The functional clusters include respective sub-networks attachable to any of the backbone ports and to any other functional cluster in the set of functional clusters independently of the source map of the Network-on-Chip backbone.

20 Claims, 6 Drawing Sheets

(51) Int. Cl.
*H04L 12/933* (2013.01)
*G06F 15/78* (2006.01)
*H04L 12/935* (2013.01)
*G06F 13/40* (2006.01)

(52) U.S. Cl.
CPC ...... *G06F 15/7825* (2013.01); *G06F 17/5077* (2013.01); *H04L 49/109* (2013.01); *H04L 49/15* (2013.01); *H04L 49/3009* (2013.01); *G06F 2217/04* (2013.01); *G06F 2217/06* (2013.01)

(58) Field of Classification Search
USPC .......................................................... 716/130
See application file for complete search history.

(56) References Cited

U.S. PATENT DOCUMENTS

| | | |
|---|---|---|
| 2011/0213949 A1 | 9/2011 | Jayasimha et al. |
| 2012/0117301 A1* | 5/2012 | Wingard ............. G06F 12/1027 711/6 |
| 2014/0204735 A1 | 7/2014 | Kumar et al. |
| 2015/0036536 A1 | 2/2015 | Kumar et al. |
| 2015/0106778 A1* | 4/2015 | Mangano ............. G06F 15/7807 716/130 |

OTHER PUBLICATIONS

Italian Search Report, dated Jan. 14, 2014, for Italian Application No. TO20130824, 3 pages.

James, "A Survey of Cluster Based Multi-Processor system design with IP-Cores," *International Journal of Scientific & Engineering Research* 2(12):1-9, 2011.

Kim et al., "A 118.4GB/s Multi-Casting Network-on-Chip for Real-Time Object Recognition Processor," IEEE Proceedings of ESSCIRC '09, Piscataway, NJ, USA, pp. 400-403, Sep. 14, 2009.

Lemaire et al., "A flexible modeling environment for a NoC-based multicore architecture," High Level Design Validation and Test Workshop (HLDVT), 2012 IEEE International, pp. 140-147, Nov. 9, 2012.

Li et al., "Protype Design and Synthesis of Cluster MPSoC Architecture for Multiple Applications," *Journal of Computers* 7(11):2671-2679, Nov. 2012.

* cited by examiner

SYSTEM FOR DESIGNING NETWORK ON CHIP INTERCONNECT ARRANGEMENTS

BACKGROUND

Technical Field

The description relates to techniques for designing on-chip systems.

One or more embodiments may apply to Network-on-Chip (NoC) interconnects, e.g., for System-on-Chip (SoC) arrangements.

One or more embodiments may provide a scalable and distributed approach to perform traffic routing in hierarchical interconnects, possibly by resorting to an architecture for a scalable SoC source map.

Description of the Related Art

Time-to-market is a factor increasingly dictating the success of modern and complex SoC products, such as application processors for mobile and multimedia applications (smartphone/tablet, Set-Top Box, Home Gateway, and so on).

So-called "platforms" are thus increasingly resorted to in order to facilitate the creation of different SoC products (derivatives) for different market segments.

A "platform" is a system which may be used, e.g., to prototype a System-on-Chip design.

Certain platform embodiments as disclosed, e.g., in EP 2 325 747 A2 may include an electronic board comprising a logic device programmable to emulate system components and a processor to execute a virtual machine monitor which redirects an input/output request to the system components via an interconnect.

It was observed that embodiments of a platform may rely on a certain architecture and a related methodology which may take advantage of common features of different SoC products to reduce the development cycle and facilitate software portability from one derivative to another.

Design and verification of, e.g., a silicon interconnect is often a time-consuming task which drastically affects time-to-market of products. This may be even more evident in a platform context when attempting to derive derivative interconnects from a common and generic interconnect.

Various embodiments may thus benefit from the possibility that a certain interconnect may be customized for various derivatives. However, different derivatives may have different underlying physical constrains, which may render interconnect re-usage difficult (if at all feasible).

It was observed that when trying to adapt a generic interconnect to a derivative one, a good deal of time may be devoted to reworking the Source Map. The Source Map provides the information for routing response transactions from slave IPs to master IPs (that initiate request transactions towards slave IPs). While the relative cost may be acceptable for certain embodiments, the possibility of avoiding such re-working activity may contribute to making the platform approach more efficient by reducing costs and development time.

BRIEF SUMMARY

Various embodiments of a platform may thus rely on generic and re-usable components, a case in point being represented by an interconnect bus which may be re-used in a set of derivative products. In order to comply with such a requirement, the need is felt for interconnect arrangements which may be rendered "agnostic" to physical constraints (e.g., floorplan, pad distribution, etc.), which may represent a relevant cost in terms of design and verification tasks.

One or more embodiments have the object of satisfying such a need.

One or more embodiments achieve that object by means of a system having the features set forth in the claims that follow.

The claims are an integral part of the technical teaching provided herein in relation with one or more embodiments.

One or more embodiments may overcome the limitations of various embodiments by means of a NoC architecture built as a collection of independent units (sub-networks).

One or more embodiments may be applied to System-on-Chip (SoC) products.

One or more embodiments may be applied, e.g., to SoC products embedding at least a host CPU and multiple IP components (i.e., IP cores) communicating between them and/or sharing resources such as on-chip memories, external DDR memories, on-chip infrastructure, etc.

One or more embodiments may adopt an approach where:
 a SoC Network on Chip (NoC) interconnect may be provided as a collection of independent sub-networks;
 the possibility may exist of expanding existing interconnects without impacting already existing ones;
 each NoC sub-network may be agnostic to the SoC source (src) map.

One or more embodiments may provide one or more of the following advantages:
 reduced silicon development time, e.g., in a platform context;
 interconnect re-spin no longer needed when deriving multiple SoCs from a same platform;
 the Source Map may be independent from SoC physical constraints, e.g., each sub-network may have a source map that is independent from the interconnect in which it will used.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless otherwise specified. One or more embodiments will now be described, purely by way of non-limiting example, with reference to the annexed figures, wherein.

DETAILED DESCRIPTION

In the ensuing description one or more specific details are illustrated, aimed at providing an in-depth understanding of examples of embodiments. The embodiments may be obtained without one or more of the specific details, or with other methods, components, materials, etc. In other cases, known structures, materials, or operations are not illustrated or described in detail so that certain aspects of embodiments will not be obscured. Reference to "one or more embodiments" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for the convenience and hence do not define the scope of protection or the scope of the embodiments.

Figure 1:
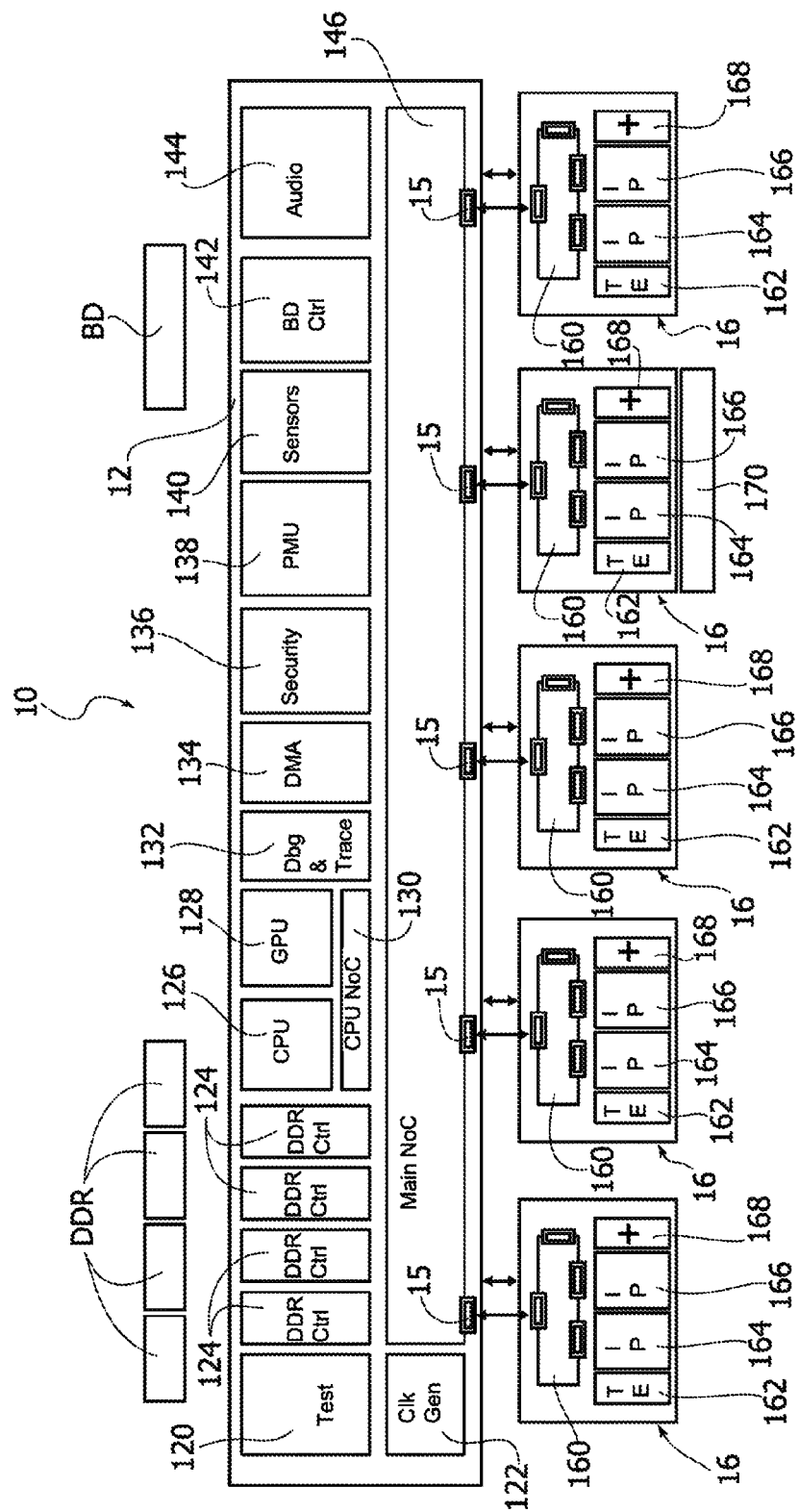
FIG. 1 is a schematic block diagram representative of embodiments of an exemplary platform.
Figure 2:
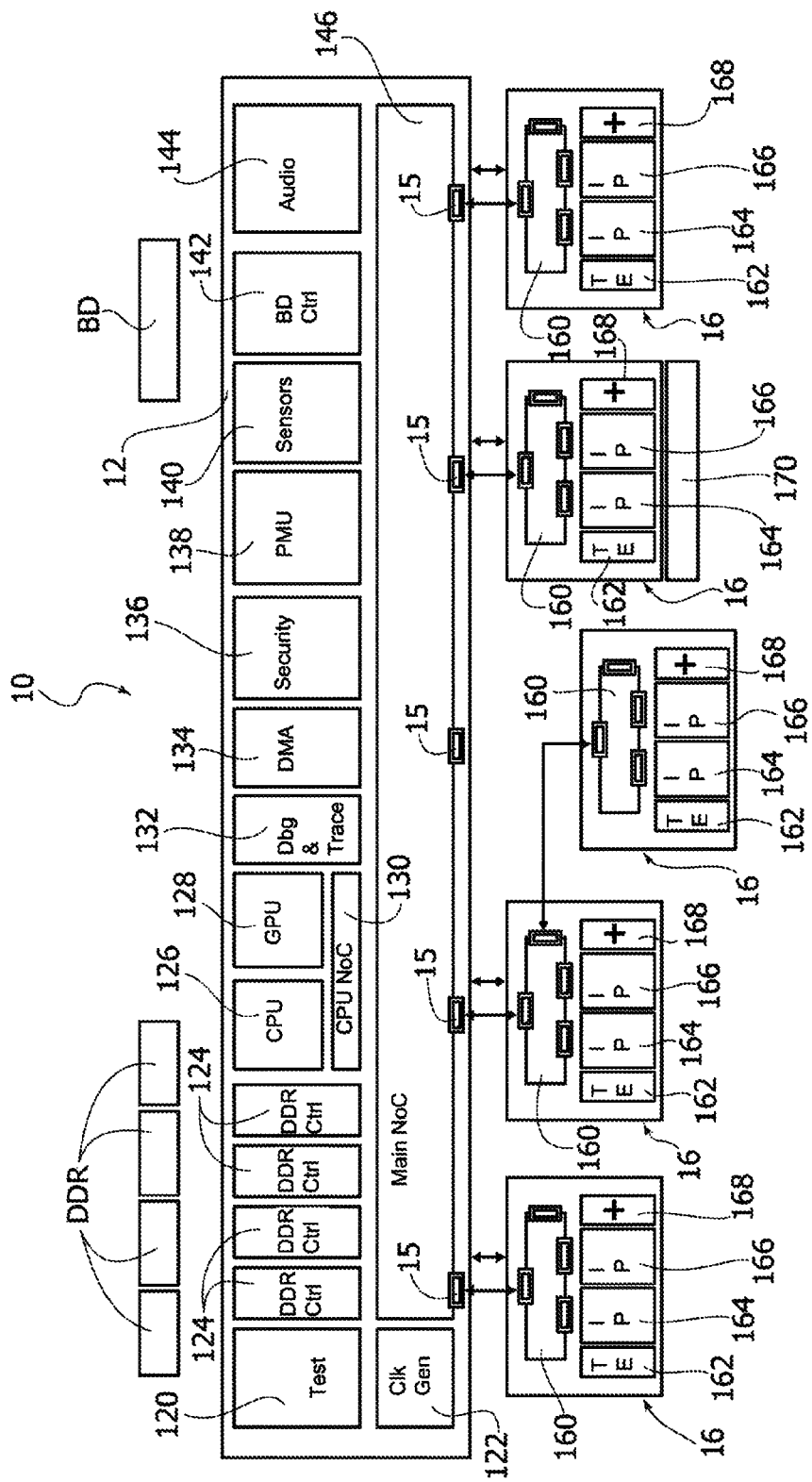
FIG. 2 represents a possible exemplary change in the platform of FIG. 1.

FIGS. 1 and 2 are generally exemplary of a "platform", i.e., a system architecture 10 adapted to produce, e.g., a Network on Chip or NoC interconnect arrangement by relying on generic and re-usable components, so that the relative interconnect may be re-used in a set of derivative products.

In one or more embodiments the platform 10 may be based on a modular approach and thus include:
a main backbone 12, and
a set of functional clusters 16.

In one or more embodiments, the platform may be configured to cooperate with entities such as memories indicated DDR (e.g., DDR memories) and/or boot devices BD.

To that effect, in one or more embodiments the main configurable backbone 12 may include modules or functions such as, e.g.:
Test—120
Clock generator—122
DDR control—124 (e.g., 0 to 3 for controlling 4 DDRs)
Central Processing Unit or CPU system—126
Graphics Processing Unit or GPU system—128
CPU NoC—130
Debug & Trace—132
Direct Memory Access or DMA—134
Security—136
Power Management or PMU—138
Sensor(s)—140
Boot Device Control—142
Audio—144
Main NoC—146.

In one or more embodiments, the arrangement of each and every unit/function as per the exemplary, non-limiting list provided in the foregoing, may be per se conventional.

In one or more embodiments, the main backbone 12 may be made configurable, e.g., with possible simplification and customization, e.g., at the DDR, interconnect, GPU, clocking level.

In one or more embodiments, the main backbone 12, e.g., the main NoC 146 may include a set of ports 15.

In one or more embodiments, the functional clusters 16 may be attached to any of the backbone ports 15.

In one or more embodiments, the functional clusters 16 may include modules or functions such as, e.g.:
a respective sub-network (sub-NoC) 160 adapted to act as an interconnect unit to the backbone port 15 in the main NoC 146,
Test Equipment 162
a set of IP's 164, 166
additional modules/functions 168, possibly adapted to interface with further associated modules/functions 170 to be attached to a cluster 16.

As used herein, reference to a "respective" sub-network 160 is intended to highlight that, in one or more embodiments, one such sub-network 160 may be provided for each one of the functional clusters 16.

Exemplary of modules or functions as per the non-limiting list provided in the foregoing may be transport, 3D GPU, video codec(s), 2D graphics, camera, networking, composition & display, high-speed links.

In one or more embodiments, the functional clusters 16 may be independent of the source map of the platform.

In one or more embodiments, each functional cluster 16 may be asynchronous to the other functional clusters 16.

In one or more embodiments, a set of SoCs may be created by using a same platform by constructing them by using the functional clusters 16 as building-elements.

In one or more embodiments, the functional clusters 16 may have a granularity beyond the one of a IP (e.g., a functional cluster may be an aggregation of IPs that all together offer a given SoC function).

This may result in an incremental approach from an existing configuration by effecting steps such as, e.g., add/remove/move features, . . . , which, e.g., may be flexible enough to accept late requests without impacting the construction.

In one or more embodiments, the functional clusters (building elements) 16 may be "agnostic" to the other homologous elements in terms of source map and Network-on-Chip, which may permit construction of a new SoC or modification of an existing SoC by putting together (composing) these elements without impacting globally an already existing structure. This is in contrast with conventional SoC development approaches, where adding or removing an IP may impact the SoC infrastructure, e.g., on an interconnect arrangement designed with a global end-to-end view of a system.

A module architecture as exemplified in FIG. 1 may permit any functional move among the functional clusters 16, including possible removal-and-move actions whereby any functional cluster 16 may be detached from main backbone 12, e.g., the main NoC 146, and made so-to-say subservient to another functional cluster as schematically represented in FIG. 2.

Such an action is exemplary of the possibility of using the functional clusters 16 as building elements adapted to be shared across different derivative SoCs, thus permitting, e.g., re-usable hardware integration.

One or more embodiments may rely on a SoC interconnect construction wherein the SoC Network on Chip or NoC interconnect is a collection of independent sub-networks that offer the ability to expand existing interconnects without impacting the already existing one, wherein each NoC sub-network is, e.g., agnostic to the SoC source (src) map.

Figure 3:
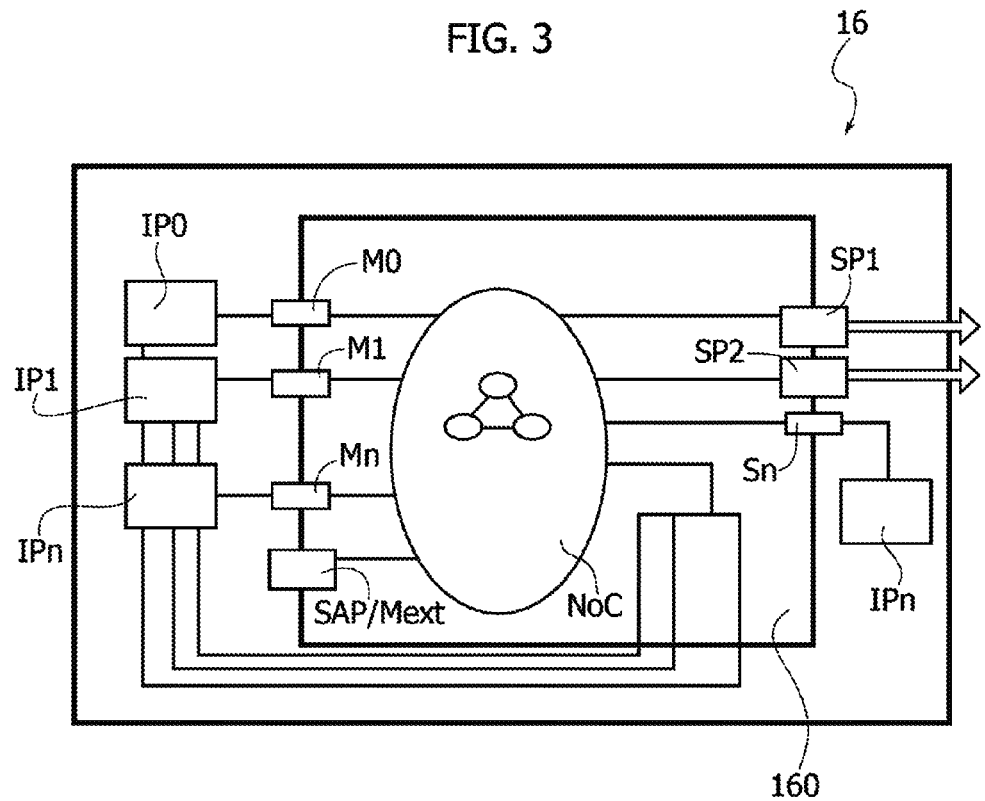
FIGS. 3 and 4 represent certain possible details of the platform of FIGS. 1 and 2.

FIG. 3 is a schematic representation of an exemplary sub-network (160 in FIGS. 1 and 2) adapted to operate as an interconnect unit dedicated to a functional cluster 16.

In one or more embodiments such a sub-network 160 may include one or more of:
a set of master ports M0, M1, . . . , Mn for use by IPs IP0, IP1, IPn (see e.g., 164, 166 in FIGS. 1 and 2) located in the functional cluster 16;
a master port SAP/Mext for connection (e.g., through SAP) to other sub-networks 160;
a set of slave ports SP1, SP2, . . . for connection to the main backbone or other sub-networks: these slave ports may possibly include first slave ports (e.g., SAP) for connection to other functional clusters (FCs) and/or the backbone and second "normal" slave ports for connection with IPs (modules) within a functional cluster;

a slave port Sn connected for accessing internal targets of the functional cluster.

The acronym SAP repeatedly used throughout this description stands for Service Access Point.

Figure 4:
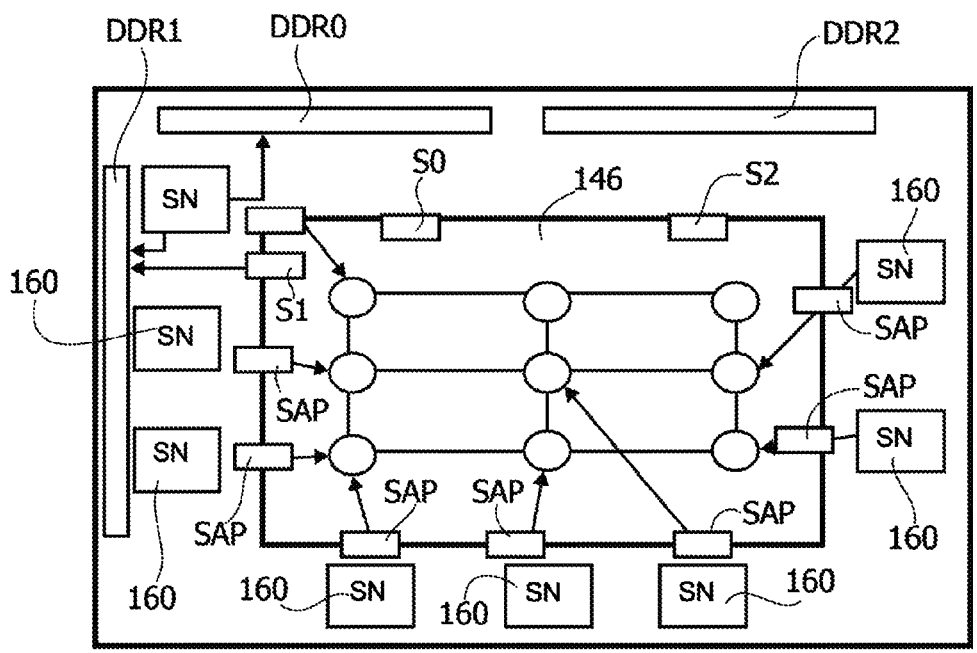

FIG. 4 is a schematic representation of an exemplary backbone (146 in FIGS. 1 and 2), that may also include a sub-network adapted to provide a NoC infrastructure that may cover "physically" the overall SoC floorplan In one or more embodiments such a sub-network may provide the following functions/services:

connection (e.g., via SAP) to the different sub-networks 160 of functional clusters 16;

slave ports, e.g., S0, S1, S2 for connection to main SoC targets (DDR), for instance in order to carry high-bandwidth traffic (e.g., to external DDRs, e.g., DDR0, DDR1, DDR2).

Figure 5:
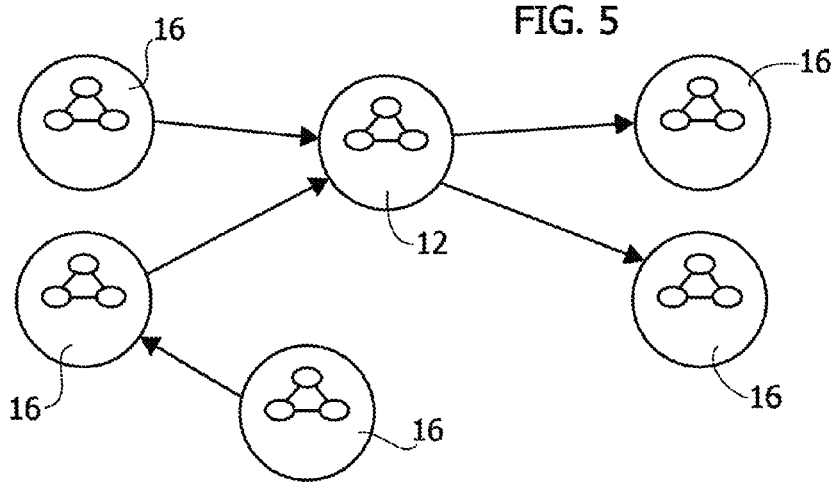
FIGS. 5 to 7 exemplify certain features of embodiments.
Figure 6:
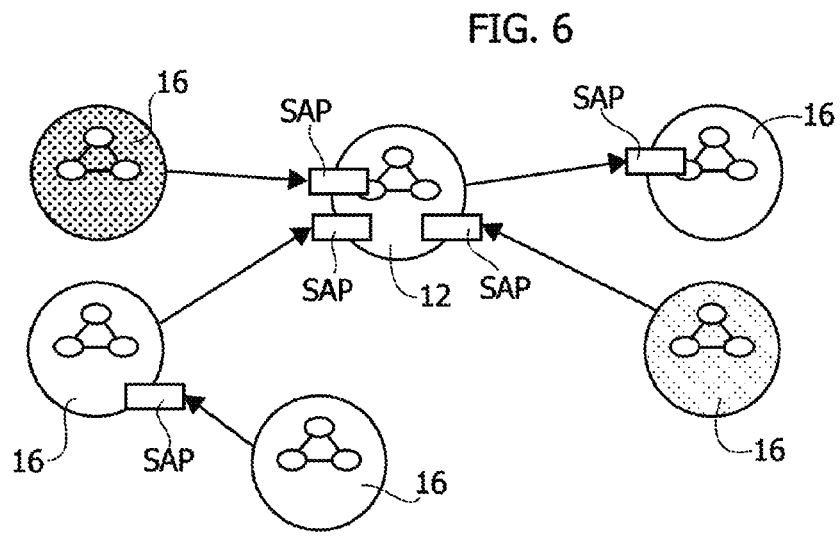
Figure 7:
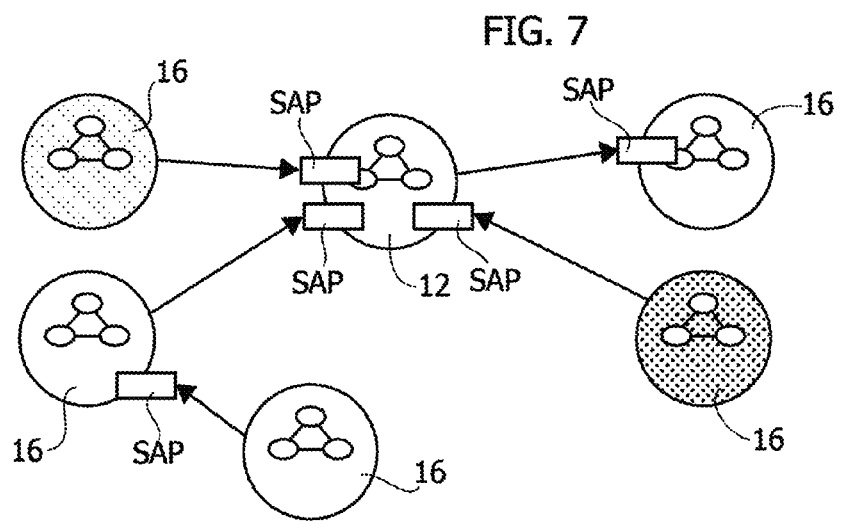

As exemplified in FIGS. 5 to 7, one or more embodiments may also offer one or more of the following:

i) the ability to chain independent functional clusters 16 to a certain backbone 12 via the respective sub-networks 146 and 160 (FIG. 5)

ii) the ability to connect any of the sub-networks 160, e.g., in the independent functional clusters 16 to any SAP of the backbone NoC or any other sub-network (FIG. 6):

iii) the ability to move a sub-network from a SAP of the backbone NoC to another one i.e., disconnect and reconnect (FIG. 7).

One or more embodiments may adopt one of at least two different options in order to implement the functions exemplified in the foregoing.

A first option, discussed in the following with reference to FIG. 8, may use an associative memory of the CAM (Content Addressable Memory) type with a number of locations which equals an upper threshold (e.g., the maximum) number of transactions which may be outstanding.

A second option, discussed in the following with reference to FIGS. 9 and 10, may adopt an offset adding strategy, which makes it possible to use a memory having a number of locations equal to the number of initiator gates; this may be accessed by way of response by using a key which contains a source code (L2 SRC) received together with the response transaction.

In one or more embodiments, the first option for constructing the interconnect may rely on a layered source map-based architecture.

In one or more embodiments, each sub-network (e.g., the sub-NoC 160 in the functional clusters 16) in such an architecture may have a local independent source map.

Assuming that:

L1-SRC is a first information element or item which denotes a source managed locally by each sub-network, and L2-SRC is a second information element or item which denotes a SoC source that identifies univocally each SoC master one may assume that each SAP of the sub-network will manage only one source value.

In one or more embodiments, this may ensure the independency of each sub-network, e.g., by making a sub-network "agnostic" towards the SRC requirements of the masters that are connected to it.

In one or more embodiments, a new field designated, e.g., L2 SRC may be added to a NoC header in order to carry the L2-SRC information.

In one or more embodiments, the L1-SRC information may be stored in each sub-network i.e., SAP.

Figure 8:
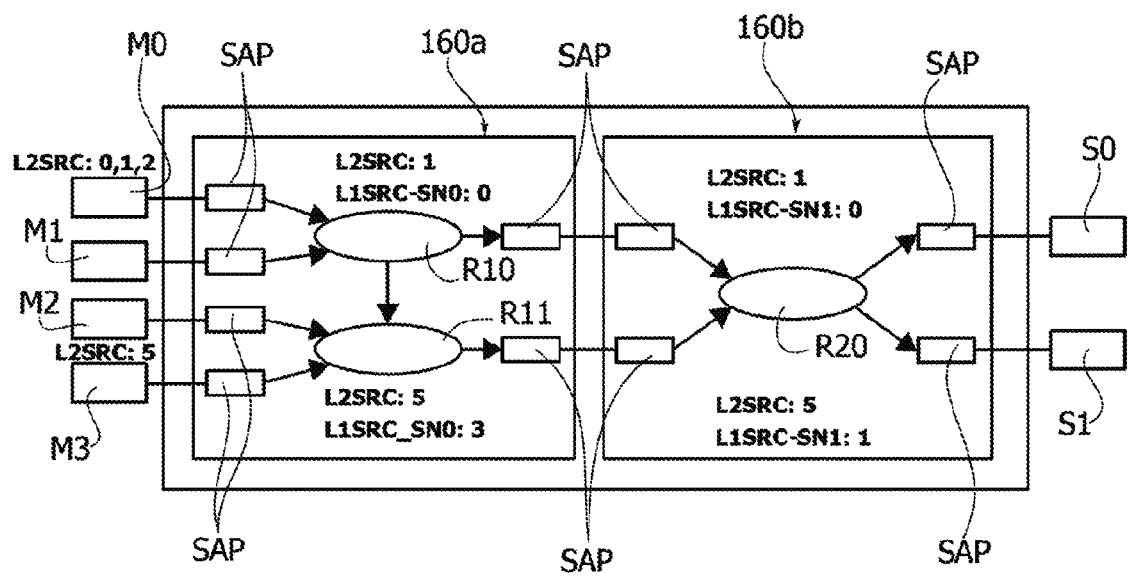
FIG. 8 exemplifies a first option for possible embodiments.

As exemplified in FIG. 8, such an approach may involve two sub-networks 160a and 160b, the one (160a=SN0) including two routers R10, R11 and the other (160b=SN1) including one router R20.

In one or more embodiments, the sub-network 160a (SN0) may manage via respective SAP modules, e.g., four (master) IPs M0, M1, M2, M3 each having a number of L2-SRC values.

In one or more embodiments, the L1-SRC SN0 may be used to manage the local sub-network reception (RX) routing, while the L2-SRC may be just carried in the NoC header and the L1-SRC SN0 may be stored in the SN0.

In one or more embodiments, the sub-network 160a (SN0) and sub-network 160b (SN1) may communicate via respective SAP modules.

In one or more embodiments, The L1-SRC SN1 may be used to manage the local sub-network reception (RX) routing, while again the L2-SRC may be just carried in the NoC header and the L1-SRC SN1 may be stored in the SN0.

In one or more embodiments, the sub-network 160b (SN1) may manage via respective SAP modules, e.g., two (slave) IPs S0 and S1.

In one or more embodiments, this approach may implement a local source map L1 for each sub-network and a global source map L2 thus permitting to build a SoC interconnect for all derivative interconnects without re-designing any part of it (e.g., sub-networks can simply be re-used and chained together in order to meet functional and physical constraints of each SoC).

In a first option as exemplified in the foregoing, the L1-SRC information may be stored in a sub-network. Such a task may be performed, e.g., in a Target Network Interface (TNI) at the output of each sub-network (SN) by employing a Contents Addressable Memory (CAM) memory.

In one or more embodiments, the depth of such a memory may correspond to an upper threshold (e.g., the maximum) number of transactions that can be outstanding (from a TNI point of view).

Each location in a CAM may thus store a L1-SRC, L2-SRC pair associated to a transaction so that, when a response transaction is back to the TNI, the L2-SRC may be used as key to perform the search in the CAM.

In one or more embodiments, another transaction identifier may be stored in a CAM in the place of the L2-SRC information (which may depend, e.g., on a particular protocol, ordering model, and so on.).

One or more embodiments may adopt a second option, which may be particularly suitable when the number of transactions that can be outstanding is high and the cost of implementing a CAM having a large number of locations would be difficult to meet due to silicon area constraints.

In one or more embodiments, a general idea behind such an option would be to build a system in such a way to have by construction a single L2-SRC range for each master port in all the sub-networks. As used herein, "single range" would apply, e.g., to contiguous (adjacent) L2-SRC values.

By resorting to such an approach, the mapping L2-SRC<->L1-SRC in a sub-network may be handled with simple memory, i.e., a table having a number of rows equal to the number of master ports.

A mechanism to dynamically fill such a table (Dynamic Source Table or DST) may be used in order to make sub-networks usable in any context of interest (which may be a requirement for the platform based approach).

In one or more embodiments, building a system in order to have by construction a single L2-SRC range may involve updating a L2-SRC:
by adding an offset in request at the input of a sub-network (SN), and
by subtracting a same offset in response at the output of a SN.

Figure 9:
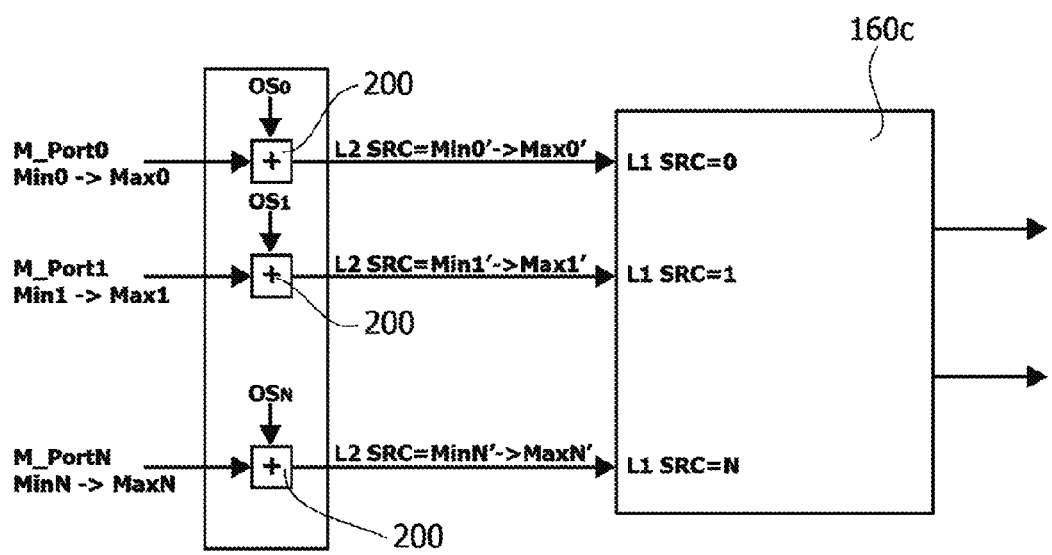
FIGS. 9 and 10, this latter figure including three portions designated a), b) and c), respectively, exemplifies a second option for possible embodiments.

The block diagram of FIG. 9 illustrates an example of a N×2 sub-network 160c where an offset, e.g., $OS_0$, $OS_1$, ..., $OS_N$ is added to the L2-SRC of each initiator (or master) port M_Port0, M_Port1, ..., M_PortN, of the sub-network.

While this is not expressly visible in the figure, a same offset may be subtracted in response at the initiator side.

As in the case of the first option discussed in the foregoing, in one or more embodiments, a routing within a sub-network SN may be by using a L1-SRC information, where the L1-SRC identifies an initiator port.

In one or more embodiments, offsets may be added by means of simple logic blocks (adders) 200 integrated when the SoC is designed.

In one or more embodiments, when sub-networks are integrated, proper offset values may be defined for each sub-network, e.g., by adopting an approach as exemplified in the following.

For instance, by assuming that for a certain sub-network or SN:
k is the index identifying an initiator port (i.e., L1-SRC) and OSk is the offset to be applied to the port k;
Min_k and Max_k identify respective minimum and maximum L2-SRC values received on the port k (before applying the offset);
Min_k' and Max_k' identify respective minimum and maximum L2-SRC values after the offset OSk has been applied,
then a value for OSk may be determined as follows:
If k=0=>OSk=0
If k!=0=>OSk=Max_(k−1)'−Min_k+1
(This means that, in one or more embodiments, the value for OSk may depend on the offset for an adjacent port).
Min_k' and Max_k' are then:
If k=0=>No Offset is applied.
If k!=0
Min_k'=Min_k+OSk=Max_(k−1)'+1
Max_k'=Max_k+OSk=Max_(k−1)'+(Max_k−Min_k)+1

By adopting such an approach, a L2-SRC range associated to the target port of a sub-network SN (in output to a Target Network Interface or TNI) may be expressed as:

Target L2-SRC−>[Min_0, Max_(N−1)'+(Max_N− Min_N)+1]

where N identifies an upper threshold (e.g., the maximum) L1-SRC of the SN.

In one or more embodiments, such an approach may ensure that the L2-SRC range received in input to whatever port of whatever SN is a single range, regardless of how the sub-networks are connected.

In one or more embodiments, the L2-SRC range received in input to whatever port of whatever SN being single range regardless of how the sub-networks are connected may be exploited in order to handle the L1-SRC information by means of a simple table.

Figure 10:
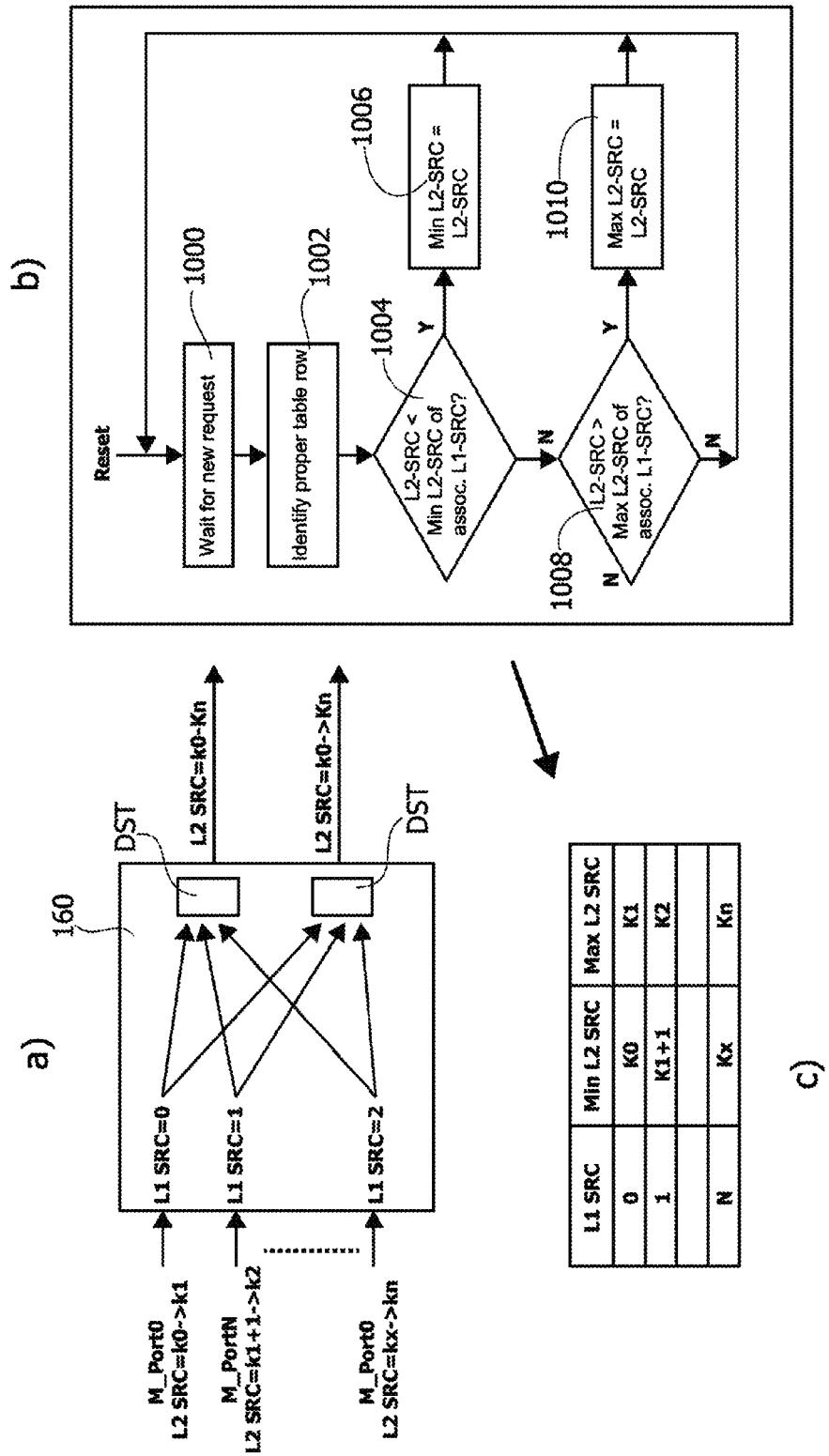

This is represented by way of example in FIG. 10, which in portion a) refers again to a certain sub-network 160c; there, each block indicated as DST may be, e.g., a dynamically managed memory with N+1 locations, where N+1 is the number of initiator ports of the sub-network (i.e., the number of possible L1-SRC values).

In one or more embodiments, such a DST memory may instantiated for each target port (e.g., each Target Network Interface or TNI) of the sub-network.

In one or more embodiments, as exemplified in portion b) of FIG. 10, each location in such a DST memory may include three fields, e.g.:
a L1 SRC field (which may not be an actual physical field, but just an the index or address of the location);
a field for storing a Min L2-SRC value associated to a corresponding L1-SRC value;
a field for storing a Max L2-SRC value associated to a corresponding L1-SRC value.

In one or more embodiments, such a table may be dynamically updated with a procedure whose basic rationale is that after an initial reset, a new request is waited for (e.g., no actions are taken as long as a no new requests are received) and, when a response is received, the L2-SRC value associated to that response is used as key to retrieve the L1-SRC to be used for the response routing in the SN.

The flowchart in portion c) of FIG. 10 illustrates an exemplary embodiment of such a procedure.

After reset, no actions are taken until a new request is received ("Wait for a new request")—step 1000.

When a new request is received, the proper table row is identified by using the L1-SRC as an index—step 1002.

If the L2-SRC associated to the new request is smaller than the Min L2-SRC associated with the L1-SRC (positive outcome Y=Yes of a step 1004) the L2-SRC value is used as new Min L2-SRC—step 1006, and processing returns upstream of the "wait" step 1000.

If step 1004 yields a negative outcome (N=No), which is indicative of the L2-SRC associated to the new request being not smaller (e.g., equal or higher) than the Min L2-SRC associated with the L1-SRC, then a check is made in a step 1008 as to whether the L2-SRC is higher than the Max L2-SRC associated to the L1-SRC.

If the L2-SRC is higher than the Max L2-SRC associated with the L1-SRC (positive outcome Y=Yes of step 1008), the L2-SRC value is used as new Max L2-SRC, and processing returns upstream of the "wait" step 1000.

If step 1008 yields a negative outcome (N=No), which is indicative of the L2-SRC associated with the new request being not higher (e.g., equal or smaller) than the Max L2-SRC associated with the L1-SRC processing returns upstream of the "wait" step 1000.

This means that if the tests of steps 1004 and 1008 yield negative outcomes, in that neither of the respective conditions are true, no updates to the table are performed.

In one or more embodiments, when a response is received, the right table row may be identified by checking the condition:

Min L2-SRC≤L2-SRC≤Max L2-SRC

The index of the table row that satisfies this condition is the L1-SRC which may be used for the response routing in the sub-network; this task may be performed, e.g., by means of a comparator network.

One or more embodiments may offer one or more of the following advantages:
an ability to construct different interconnects of derivative SoCs belonging to a same platform by using the same building elements (e.g., the sub-networks of the functional clusters 16);
a layered source map approach may permit to build derivative interconnects that are independent from physical constraints of different derivative SoCs (e.g., permitting chaining of sub-networks);

low-cost solutions may become feasible by making use of a simplified memory (e.g., according to the second option discussed in the foregoing).

Without prejudice to the underlying principles of the invention, the details and embodiments may vary, even significantly, with respect to what is illustrated herein purely by way of non-limiting example, without thereby departing from the extent of protection. The extent of protection is determined by the claims that follow.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A modular platform device, comprising:
   a main Network-on-Chip backbone with a plurality of backbone ports;
   a backbone memory to store a backbone source map that contains information for routing transactions through the main Network-on-Chip backbone;
   a first functional cluster including a first sub-network, at least one IP core, and a first memory, the first sub-network attachable to a first backbone port and attachable to the at least one IP core of the first functional cluster, wherein the first memory is arranged to store a first source map that contains information for routing transactions through the first sub-network; and
   a second functional cluster including a second sub-network, at least one IP core, and a second memory, the second sub-network attachable to a second backbone port and attachable to the at least one IP core of the second functional cluster, wherein the second memory is arranged to store a second source map that contains information for routing transactions through the second sub-network.

2. The modular platform device of claim 1, wherein each attachment of the first sub-network and each attachment of the second sub-network is independent of the backbone source map.

3. The modular platform device of claim 1, wherein the first functional cluster and the second functional cluster each provide a plurality of System-on-Chip functions.

4. The modular platform device of claim 1, further comprising:
   a third functional cluster including a third sub-network and a third memory, the third sub-network attachable to the second sub-network of the second functional cluster, wherein the third memory is arranged to store a third source map that contains information for routing transactions through the third sub-network.

5. The modular platform device of claim 1, wherein the first independent local source map includes:
   an IP core information item indicative of a source managed locally by the first sub-network; and
   a source information item indicative of a System-on-Chip source that identifies a System-on-Chip master.

6. The modular platform device of claim 1, wherein the first functional cluster and the second functional cluster operate asynchronously.

7. The modular platform device of claim 1, wherein the first memory is a Contents Addressable Memory.

8. The modular platform device of claim 7, wherein a size of the Contents Addressable Memory determines a number of outstanding transactions in the first sub-network.

9. The modular platform device of claim 1, wherein the first memory is a simple memory.

10. The modular platform device of claim 1, wherein the first source map pairs information associated with the main Network-on-Chip backbone to information associated with the at least one IP core of the first functional cluster.

11. A Network-on-Chip interconnect design method, comprising:
    providing a Network-on-Chip backbone with a plurality of backbone ports;
    loading a backbone memory with a backbone source map that contains information to route transactions through the Network-on-Chip backbone;
    providing a first functional cluster, the first functional cluster including a first sub-network, at least one IP core, and a first memory;
    providing a second functional cluster, the second functional cluster including a second sub-network, at least one IP core, and a second memory;
    attaching the first sub-network to a first backbone port of the plurality of backbone ports;
    attaching the first sub-network to the at least one IP core of the first functional cluster;
    loading a first source map in the first memory with information to route transactions through the first sub-network;
    attaching the second sub-network to a second backbone port of the plurality of backbone ports;
    attaching the second sub-network to the at least one IP core of the second functional cluster; and
    loading a second source map in the second memory with information to route transactions through the first sub-network.

12. The Network-on-Chip interconnect design method of claim 11, wherein providing the first functional cluster includes:
    providing a plurality of System-on-Chip functions.

13. The Network-on-Chip interconnect design method of claim 11, comprising:
    providing a third functional cluster, the third functional cluster including a third sub-network, at least one IP core, and a third memory;
    attaching the third sub-network to the first sub-network;
    loading a third source map in the third memory with information to route transactions through the third sub-network.

14. The Network-on-Chip interconnect design method of claim 13, comprising:
    attaching the third sub-network to the at least one IP core of the third functional cluster.

15. The Network-on-Chip interconnect design method of claim 11, wherein the first memory is a Contents Addressable Memory.

16. A method carried out with a processor-based system, comprising:
    executing computer code with the processor-based system that provides a design of a first System-on-Chip having at least two functional clusters communicatively coupled to a Network-on-Chip backbone, each functional cluster having a sub-network, the first System-on-Chip having a global source map to store information to route transactions through the Network-on-Chip backbone, each sub-network of each functional cluster having an independent source map to store information to route transactions; and executing computer code with the processor-based system that derives a design of a second System-on-Chip from the design of the first System-on-Chip, wherein at least one of the at least two second System-on-Chip independent local source maps corresponds to at least one of the at least two first System-on-Chip independent local source maps, and wherein at least one of the at least two second System-on-Chip independent local source maps is different from at least one of the at least two first System-on-Chip independent local source maps.

17. The method carried out with a processor-based system of claim 16, wherein the sub-network of a second functional cluster of the at least two functional clusters is communicatively coupled to the Network-on-Chip backbone through the sub-network of a first functional cluster of the at least two functional clusters.

18. The method carried out with a processor-based system of claim 16, comprising:

storing at least one independent local source map in a Contents Addressable Memory.

19. The method carried out with a processor-based system of claim 18, wherein a size of the Contents Addressable Memory determines a possible number of outstanding transactions in a respective sub-network.

20. The method carried out with a processor-based system of claim 16, wherein the at least two functional clusters of the first System-on-Chip provide different System-on-Chip functions from the at least two functional clusters of the second System-on-Chip.

* * * * *